_United States Patent Office_

3,380,997
Patented Apr. 30, 1968

3,380,997
PLASTICIZED CELLULOSE DERIVATIVES
Robert F. Williams, Jr., and Leonidas H. Pancoast, Jr., Rochester, N.Y., assignors to Eastman Kodak Company, Rochester, N.Y., a corporation of New Jersey
No Drawing. Continuation-in-part of application Ser. No. 345,069, Feb. 17, 1964. This application June 28, 1967, Ser. No. 649,464
9 Claims. (Cl. 260—225)

ABSTRACT OF THE DISCLOSURE

A non-exuding, internally plasticized cellulose ester can be obtained by reacting a monoepoxide with a dicarboxylic acid-substituted cellulose ester having some free carboxylic acid groups. For example cellulose acetate phthalate having at least 5% phthalyl can be reacted with monoepoxy-dodecane to yield the desired, covalently bonded, non-exuding plasticized cellulose ester product.

This application is a continuation-in-part of copending U.S. patent application, Ser. No. 345,069, filed Feb. 17, 1964 and now abandoned.

This invention relates to plasticized cellulose derivatives, and more particularly to cellulose esters having plasticizers covalently bonded thereto.

A large number of plasticizers for cellulose esters have been disclosed in the literature. All of the previously known plasticizers have suffered from the disadvantage that they exude to a greater or less degree from the cellulose ester composition. Even the most satisfactory plasticizers with regard to low exudation have nevertheless exuded from the cellulose ester composition, particularly after exposure for long periods of time to sunlight or weather variations. When the plasticizer exudes from the cellulose ester composition, the composition becomes brittle and its properties in general deteriorate. It therefore appears desirable to provide a plasticized cellulose ester composition, from which composition the plasticizer cannot exude.

One object of our invention is to provide plasticized cellulose esters. Another object of our invention is to provide cellulose esters which have plasticizers chemically or covalently bonded thereto. A further object of our invention is to provide cellulose ester compositions which have superior resistance to the adverse effects of exposure to sunlight or weather variations. Other objects of our invention will appear herein.

These and other objects of our invention are accomplished by providing cellulose esters having plasticizers covalently bonded thereto. We have found that cellulose esters containing free carboxyl groups, such as dibasic acid esters of cellulose, may be reacted with molecules containing one and only one epoxy group to provide cellulose esters having a plasticizer covalently bonded thereto. Since the plasticizer is bonded to the cellulose ester in accordance with our invention, exudation is avoided. The cellulose esters of our invention have superior resistance to the adverse effects of exposure to sunlight or weather variations.

Our invention will be further illustrated in the following examples which show covalently bonding certain plasticizers to cellulose acetate propionate phthalates.

EXAMPLE 1

5 grams of a cellulose acetate propionate phthalate which contained about 28.2% acetyl, 13.1% propionyl, 6.5% phthalyl and 0.9% free hydroxyl was dissolved in 5.24 grams of epoxy ethyl benzene. The solution was heated in an oven at 160° C. for 15 minutes, forming a gelatinous solid which was dissolved in acetone, precipitated, washed and dried in anhydrous alcohol. The hydroxy ethyl benzene ester of cellulose acetate propionate phthalate thus prepared was compared with a sample of the untreated cellulose acetate propionate phthalate. The plasticized cellulose derivative of the invention had a melting point of 200° C. whereas the melting point of the original cellulose ester was 219° C.

EXAMPLE 2

Cellulose acetate phthalate containing about 21.6% acetyl, 34.4% phthalyl and 1.6% free hydroxyl was reacted with various quantities of styrene oxide, as shown in Table 1 to obtain the hydroxy ethyl benzene ester of cellulose acetate phthalate. The results are shown in the following table.

TABLE I

| Mole Styrene Oxide Per Free Carboxyl | Melting Point | Char Point | Water Tolerance [1] |
|---|---|---|---|
| None | 212 | 245 | 91.7 |
| .5 | 205–210 | 255 | 84.6 |
| 1 | 205–208 | 260 | 73.9 |
| 2 | 180–184 | 260 | 58.5 |

[1] Water-tolerance value is a measure of the amount of water required, in milliliters, to start precipitation of the ester from 125 ml. of an acetone solution of 0.1% concentration. The initial point of turbidity formation, indicating the start of precipitation, is determined photometrically in an apparatus similar to that described by Morey and Tamblyn, J. Applied Phys., vol. 16, p. 419 (1945).

EXAMPLE 3

The cellulose acetate phthalate described in Example 2 was refluxed for 4 hours in cyclohexanone at 156° C. alone and with various epoxy derivatives. The effect on the melting point of the composition is shown in Table II.

TABLE II

| Epoxy Compound | Mole Epoxy Compound Per Free Carboxyl | Melting Point | Water Tolerance |
|---|---|---|---|
| 0 None | 0 | 196–208 | 99.5 |
| 1 Styrene oxide | 2 | 193–200 | 69.5 |
| 2 Isooctyl-9,10-epoxy stearate | 2 | 180–190 | 50.3 |
| 3 2-methyl-9,10-epoxy stearate | 2 + | 183 | 57.0 |
| 4 di-2-ethyl hexyl-4,5-epoxy tetrahydrophthalate | 2 | 198–210 | 75.7 |

The reaction products obtained were:

(1) Hydroxy ethyl benzene ester of cellulose acetate phthalate.

(2) The (9- or 10-) hydroxy isooctyl stearate ester of cellulose acetate phthalate.

(3) The (9- or 10-) hydroxy-2-methyl stearate ester of cellulose acetate phthalate.

(4) The (4- or 5-) hydroxy-di-2-ethyl hexyl tetrahydrophthalate ester of cellulose acetate phthalate.

As can be seen in the foregoing examples, when a cellulose ester containing free carboxyl groups is reacted with a molecule containing one epoxy group, a reaction takes place which covalently bonds the epoxy containing molecule to the cellulose ester through the free carboxyl group. The plasticizing effect is indicated by the melting point of the composition thus obtained (normally lower than the unreacted compound). In addition, the cellulose derivatives obtained in accordance with the invention were compared with the original cellulose esters with regard to their water tolerance. The water tolerance of the cellulose derivatives reacted with an epoxy containing molecule in accordance with the invention was found to be appreciably lower in each instance than that of the untreated cellulose ester starting materials, thus indicating reaction between the epoxy containing molecules and the cellulose esters through the free carboxyl groups.

The cellulose esters which may be plasticized in accordance with our invention broadly include all of the dibasic acid esters of cellulose, which esters contain free carboxyl groups. Thus, the invention includes plasticizing dibasic acid esters of cellulose (such as the succinate, maleate, glutarate, phthalate, tetrahydrophthalate and hexahydrophthalate cellulose esters), wherein the dibasic acid group contains 4–10 carbon atoms. Also, tribasic acid esters of cellulose, such as trimellitate cellulose esters, may be plasticized in accordance with our invention. Particularly advantageous starting materials are the cellulose succinates, cellulose maleates, cellulose phthalates and cellulose tetrahydrophthalates. The starting material may contain only a small percentage, such as about 5%, based on the weight of the cellulose ester, of the dibasic acid. However, the cellulose may be, if desired, substantially completely esterified with the dibasic acid ester. While the particular proportion, by weight, of dibasic acid substituents on the cellulose esters that are useful in the practice of this invention will vary somewhat, depending upon not only the average number of acidic groups per anhydroglucose unit in the cellulose molecule, but also upon the molecular weight of the particular acidic substituent, generally between about 0.05 and 3 groups derived from dibasic acid (i.e., "diacyl" groups) per anhydroglucose unit should be present in the materials of this invention. Thus, it can be said that the "degree of substitution" of the cellulosic materials of this invention (with respect to the diacyl substituents) is between about 0.05 and 3. This does not mean, however, that all or even most of the diacyl groups on the cellulose molecule must be reacted with the useful epoxy compounds in order to yield a successfully internally plasticized, non-exuding cellulose ester. As a matter of fact, acceptably plasticized materials can be produced by reacting as little as 2% of the carboxyl groups of the cellulose derivative with the epoxy compound, although preferably at least about 5% of the "diacyl" groups in the cellulosic product should have been reacted with the epoxy compound for optimum plasticization results. Especially useful results are obtained with mixed esters, such as cellulose acetate phthalate, cellulose propionate phthalate, cellulose butyrate phthalate, cellulose acetate propionate phthalate and cellulose acetate butyrate phthalate wherein the phthalyl comprises at least about 5% of the weight of the cellulose derivative.

The plasticized cellulose derivatives of our invention may be represented by the following Formula 1:

(1)  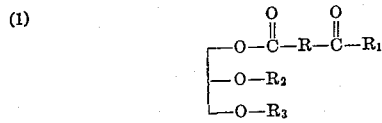

wherein E represents the anhydroglucose unit of cellulose and R represents a divalent hydrocarbon radical containing from 2 to about 10 carbon atoms. This divalent hydrocarbon radical is preferably either (a) an alkylene group containing from 2 to 6 carbon atoms, (b) an arylene group containing from 6 to 10 carbon atoms (wherein the aryl portion is mononuclear; i.e., it contains only one ring) such as phenylene or 2,3-dimethyl phenylene or (c) a divalent saturated monocyclic radical such as cyclohexylene 2,5-dimethyl cyclohexylene, or cyclobutylene.

Due to the nature of the reaction of an epoxy group with a carboxylic group (which yields an α-hydroxy ester), $R_1$ (in Formula 1, above) which can be derived from the epoxy reactant is either a saturated or an unsaturated monohydroxy substituted hydrocarbon radical containing from 5 to about 30 or more carbon atoms, and preferably is saturated and contains from about 15 to about 25 carbon atoms, although the preferred group hydroxy-ethyl benzene (derived from styrene oxide) is an exception to this preferred range of materials. The hydroxy substituent is on the carbon atom adjacent to the carbon atom that is bonded directly to the acyl oxygen atom (which is a part of the diacyl substituent on the cellulose molecule). Since it is not necessary for all of the dicarboxylic acid ester groups to be reacted with the epoxy material in order to obtain the advantages of the present invention, some of $R_1$ can also be hydrogen (from unreacted carboxylic acid). However, in any event, at least about 2% of $R_1$ must be derived from the epoxy reactant (i.e., it must be organic in nature).

$R_2$ and $R_3$ in Formula 1, above, are each selected from the group consisting of:

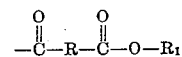

(R and $R_1$ being the same as indicated above); alkyl groups containing 1 to 4 carbon atoms (such as methyl, ethyl, propyl, butyl, isobutyl and the like); monoacyl groups containing 2 to 6 (preferably 2 to 4) carbon atoms (such as acetyl, butyryl, propionyl, isobutyryl, and the like); and diacyl groups containing 4 to 8 carbon atoms (such as phthalyl, tetrahydrophthalyl, succinyl, glutaryl, malealyl, and the like).

It is necessary that $R_1$ contain at least 5 carbon atoms. When $R_1$ is, for example, an alkylene group of 2 to 4 carbon atoms, the properties of the ester are inferior to those of the invention, particularly with respect to weather resistance. Moreover, such esters are not deemed plasticized, whereas those of the invention are.

The plasticizers which are reacted with the cellulose esters containing free carboxyl groups in accordance with our invention are those which contain one and only one epoxy group. When more than one epoxy group is present in the molecule, cross-linking occurs thus defeating the plasticizing effect obtained in accordance with the invention. The epoxy containing molecules which we use in our invention are those which contain at least 5, and preferably 15 to 25 or more, carbon atoms in the molecule. As a general rule, the greater the number of carbon atoms, the greater the plasticizing effect. In addition to epoxy alkylene groups, it is also possible to use epoxy alkyl benzenes wherein the alkyl group contains at least 2 carbon atoms, as well as epoxy alkylene tetrahydrophthalate plasticizers. The epoxy containing compounds useful herein may contain atoms other than carbon, hydrogen and the epoxy oxygen, the only limitation being that the atoms or substituents do not react to cross-link the composition.

The reaction of the epoxy containing plasticizer with the free carboxyl containing cellulose ester may be effected in any convenient way, such as by heating the composition, or by refluxing it in an inert solvent. In some instances, it is desirable to form a physical mixture of the epoxy derivative and the free carboxyl containing cellulose ester, and effect reaction during formation of the mixture into useful articles, for example, by molding or extruding the composition, or casting a solvent solution onto a surface and heating to effect reaction. When this procedure is used, it is desirable to employ an epoxy compound having a boiling point above the temperature at which the composition is fabricated into useful articles. The amount of epoxy compound based on the free carboxyl content of the cellulose ester may be varied over a wide range, it being sufficient if there is enough epoxy compound employed to react with at least about 2% of the carboxyl groups of the cellulose derivative. If desired, an excess of the epoxy compound may be employed in the cellulose derivatives used in the invention to provide additional plastication of the composition, or additional plasticizers may be added in addition to the epoxy containing compounds.

The invention has been described in detail with particular reference to preferred embodiments thereof but it will be understood that variations and modifications can be effected within the spirit and scope of the invention as described hereinabove and as defined in the appended claims.

What is claimed is:
1. A non-exuding, internally plasticized cellulose ester having the structure

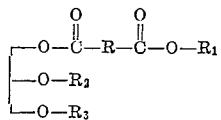

wherein
(a) R is a divalent hydrocarbon radical containing from 2 to about 10 carbon atoms and is selected from the group consisting of alkylene, mononuclear arylene and saturated monocyclic radicals;
(b) $R_1$ is selected from the group consisting of hydrogen and a monohydroxy-substituted hydrocarbyl radical containing from 5 to about 30 carbon atoms; the hydroxy substituent being attached to the carbon atom adjacent to the carbon atom that is directly attached to the acyl oxygen atom; at least about 2% of $R_1$ being said hydrocarbyl radical; and
(c) $R_2$ and $R_3$ are selected from the group consisting of radicals having the structure

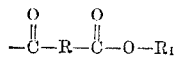

alkyl groups containing 1 to 4 carbon atoms, monoacyl groups containing 2 to 6 carbon atoms, and diacyl groups containing 4 to 10 carbon atoms.
2. A non-exuding, internally plasticized cellulose ester as in claim 1, wherein $R_1$ is a saturated hydrocarbon radical containing from about 15 to about 25 carbon atoms.
3. A non-exuding, internally plasticized cellulose ester as in claim 1, wherein $R_1$ is hydroxyethyl benzene.
4. A dibasic acid ester of cellulose having from about 0.05 to 3 diacyl groups per anhydroglucose unit; at least about 2 percent of the diacyl groups having been reacted with an epoxy compound having only one epoxy group per molecule; said epoxy compound being a hydrocarbon except for said epoxy group and containing from 5 to about 30 carbon atoms.
5. A dibasic acid ester of cellulose as in claim 4, wherein said dibasic acid is phthalic acid.
6. A dibasic acid ester of cellulose as in claim 4, wherein said epoxy compound contains from about 15 to about 25 carbon atoms.
7. A mixed phthalate ester of cellulose selected from the group consisting of cellulose acetate phthalate, cellulose propionate phthalate, cellulose butyrate phthalate, cellulose acetate propionate phthalate and cellulose acetate butyrate phthalate containing at least 5 percent by weight of phthalyl groups and having a degree of substitution between about 0.05 and 3, wherein at least about 5% of said phthalyl groups having been reacted with an epoxy compound; said epoxy compound being a hydrocarbon except for the epoxy oxygen containing (a) from 5 to about 30 carbon atoms and (b) a single epoxy group.
8. A non-exuding, plasticized cellulose phthalate ester containing from about 0.05 to 3 phthalate groups per anhydroglucose unit; at least about 5% of said phthalate groups having been reacted with styrene oxide to form thereby hydroxyethyl benzene ester groups.
9. A non-exuding, plasticized cellulose phthalate ester as in claim 8, wherein said styrene oxide is replaced by an alkyl monoepoxide containing from about 15 to about 24 carbon atoms; said epoxide having been reacted with at least about 5% of said phthalate groups to form thereby the corresponding monohydroxy-substituted alkyl ester.

References Cited
UNITED STATES PATENTS

| | | | |
|---|---|---|---|
| 3,203,912 | 7/1965 | Mark et al. | 260—209 |
| 2,689,863 | 9/1954 | Broderick | 260—224 XR |
| 2,581,565 | 1/1952 | White et al. | 260—225 |
| 2,865,898 | 12/1958 | Hiatt et al. | 260—225 |

DONALD E. CZAJA, *Primary Examiner.*
R. W. MULCAHY, *Assistant Examiner.*